US 8,006,550 B2

(12) United States Patent
Oblizajek et al.

(10) Patent No.: US 8,006,550 B2
(45) Date of Patent: Aug. 30, 2011

(54) METHODS AND SYSTEMS FOR TESTING TIRES OF VEHICLES TO QUANTIFY TRANSIENT TIRE FORCE AND MOMENT RESPONSES

(75) Inventors: Kenneth L. Oblizajek, Troy, MI (US); William A. Cobb, Brighton, MI (US); John D. Sopoci, Commerce Township, MI (US); Jonathan Darab, West Bloomfield, MI (US); David L. Howland, Webberville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 318 days.

(21) Appl. No.: 12/422,342

(22) Filed: Apr. 13, 2009

(65) Prior Publication Data

US 2010/0257925 A1 Oct. 14, 2010

(51) Int. Cl.
*G01M 17/02* (2006.01)
*B60K 28/16* (2006.01)
(52) U.S. Cl. .......................................... 73/146; 701/82
(58) Field of Classification Search ........................ None
See application file for complete search history.

(56) References Cited

U.S. PATENT DOCUMENTS

| | | | |
|---|---|---|---|
| 6,561,018 B2* | 5/2003 | Mancosu et al. ................ 73/146 |
| 6,648,426 B1* | 11/2003 | Boettiger et al. ............. 303/146 |
| 7,203,603 B2* | 4/2007 | Bertrand ........................ 702/41 |
| 2001/0020386 A1* | 9/2001 | Mancosu et al. ................ 73/146 |
| 2002/0014114 A1* | 2/2002 | Mancosu et al. ................ 73/146 |
| 2002/0166373 A1* | 11/2002 | Mancosu et al. ................ 73/146 |
| 2005/0065666 A1* | 3/2005 | Miyashita et al. ................ 701/1 |
| 2005/0150702 A1* | 7/2005 | Matsuzaki .................... 180/197 |
| 2007/0233352 A1* | 10/2007 | Miyashita et al. .............. 701/82 |
| 2009/0210128 A1* | 8/2009 | Fujimoto et al. ................ 701/84 |

* cited by examiner

*Primary Examiner* — Andre J Allen
(74) *Attorney, Agent, or Firm* — Ingrassia Fisher & Lorenz, P.C.

(57) ABSTRACT

A method for testing a tire of a vehicle that includes the steps of creating a first condition comprising a first slip angle of the tire, obtaining a first set of data regarding performance of the tire under the first condition, creating a second condition comprising either a second slip angle or lateral displacement of the tire, obtaining a second set of data regarding performance of the tire under the second condition, and determining the transient response of the lateral force and aligning moment of the tire, using the first set of data and the second set of data.

20 Claims, 10 Drawing Sheets

DISTANCE TRAVELLED DOMAIN - LATERAL FORCE $$a_3 \frac{d^3}{dx^3} F_y + a_2 \frac{d^2}{dx^2} F_y + a_1 \frac{d}{dx} F_y + F_y = b_0 \alpha(x)$$

DISTANCE TRAVELLED DOMAIN - ALIGNING MOMENT $$g_3 \frac{d^3}{dx^3} M_z + g_2 \frac{d^2}{dx^2} M_z + g_1 \frac{d}{dx} M_z + M_z = h_3 \frac{d^3}{dx^3} \alpha(x) + h_2 \frac{d^2}{dx^2} \alpha(x) + h_1 \frac{d}{dx} \alpha(x) + h_0 \alpha(x)$$

SPATIAL FREQUENCY DOMAIN - LATERAL FORCE $$F_y(s) = \frac{b_0}{a_3 s^3 + a_2 s^2 + a_1 s + 1} \alpha(s)$$

SPATIAL FREQUENCY DOMAIN - ALIGNING MOMENT $$M_z(s) = \frac{h_3 s^3 + h_2 s^2 + h_1 s + h_0}{g_3 s^3 + g_2 s^2 + g_1 s + 1} \alpha(s)$$

Where  $F_y$ = Lateral Force  (N)
$M_z$ = Aligning Moment (Nm)
s = Spatial Frequency, $\omega$(rad/m) times (-i), where i=square-root(-1)
$a_n, b_0, g_n, h_n$ are all scalar coefficients where n = 0, 1, 2, 3
x = distance travelled (m)

FIG. 9

DISTANCE TRAVELLED DOMAIN – LATERAL FORCE

$$a_3 \frac{d^3}{dx^3} F_y + a_2 \frac{d^2}{dx^2} F_y + a_1 \frac{d}{dx} F_y + F_y = b_0 \alpha(x) \quad \text{TRANSIENT FUNCTION}$$

$$F_{y,\text{measured}} = F_y + \sum_{n=1}^{N} c_n \sin(n(\theta - \theta_{cn})) \quad \text{NON-UNIFORMITY FUNCTION}$$

DISTANCE TRAVELLED DOMAIN – ALIGNING MOMENT

$$g_3 \frac{d^3}{dx^3} M_z + g_2 \frac{d^2}{dx^2} M_z + g_1 \frac{d}{dx} M_z + M_z = h_3 \frac{d^3}{dx^3} \alpha(x) + h_2 \frac{d^2}{dx^2} \alpha(x) + h_1 \frac{d}{dx} \alpha(x) + h_0 \alpha(x) \quad \text{TRANSIENT FUNCTION}$$

$$M_{z,\text{measured}} = M_z + \sum_{n=1}^{N} d_n \sin(n(\theta - \theta_{dn})) \quad \text{NON-UNIFORMITY FUNCTION}$$

SPATIAL FREQUENCY DOMAIN – LATERAL FORCE

$$F_y(s) = \frac{b_0}{a_3 s^3 + a_2 s^2 + a_1 s + 1} \alpha(s) + \sum_{n=1}^{N} c_n \cdot e^{i \cdot n \cdot \theta_{cn}} \cdot \delta(\omega - n \cdot \omega_0)$$

SPATIAL FREQUENCY DOMAIN – ALIGNING MOMENT

$$M_z(s) = \frac{h_3 s^3 + h_2 s^2 + h_1 s + h_0}{g_3 s^3 + g_2 s^2 + g_1 s + 1} \alpha(s) + \sum_{n=1}^{N} d_n \cdot e^{i \cdot n \cdot \theta_{dn}} \cdot \delta(\omega - n \cdot \omega_0)$$

Where  $F_y$ = Lateral Force from Tire Transient Response (N)
$F_{y,\text{measured}}$ = Measured Lateral Force with Non-Uniformity and Tire Transient Response (N)
$M_z$ = Aligning Moment from Tire Transient Response (Nm)
$M_{z,\text{measured}}$ = Measured Aligning Moment with Non-Uniformity and Tire Transient Response (Nm)
s = Spatial Frequency, $\omega$(rad/m) times (-i), where i=square-root(-1)   (rad/m)
$\omega_0$ = 1st Harmonic Spatial Frequency of Assembly   (rad/m)
n = Harmonics of Assembly   (n=1, 2,...N)
N = Highest Assembly Harmonic accounted for in non-uniformity
$a_j, b_j, g_j, h_j$ are all scalar coefficients where j = 0, 1, 2, 3
$c_n, \theta_{cn}, d_n, \theta_{dn}$, are all scalar coefficients where n=1 ... N
x = distance travelled (m)
$\theta$ = angular orientation of tire (radians)
$\delta$ = Delta function
s = Spatial Frequency, $\omega$(rad/m) times (-i), where i=square-root(-1)

FIG. 10

METHODS AND SYSTEMS FOR TESTING TIRES OF VEHICLES TO QUANTIFY TRANSIENT TIRE FORCE AND MOMENT RESPONSES

TECHNICAL FIELD

The present invention generally relates to the field of vehicles and, more specifically, to methods and systems for testing tires of vehicles to determine transient force and moment responses.

BACKGROUND OF THE INVENTION

For today's vehicles, tires are generally tested as they are designed and manufactured, along with various other points during the lifespan of the tire. For example, tires may be tested during the development of the tires or the vehicles to which the tires belong, for example to evaluate vehicular performance and use of the tires going forward and to further improve future tire composition. Typically, tires are tested under quasi-steady state conditions. However, in certain circumstances it may be desirable to conduct tests on tires in a manner that simulates dynamic conditions.

Accordingly, it is desirable to provide an improved method for conducting tests of tires of a vehicle that simulate dynamic conditions of the tire. It is also desirable to provide an improved program product for conducting such tire tests on vehicles. It is further desirable to provide an improved system for conducting such tire tests on vehicles. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for testing a tire of a vehicle is provided. The method comprises the steps of creating a first condition comprising a first slip angle of the tire, obtaining a first set of data regarding performance of the tire under the first condition, creating a second condition comprising a second slip angle of the tire, obtaining a second set of data regarding performance of the tire under the second condition, and determining relationships of the forces and moments of the tire, using the first set of data and the second set of data.

In accordance with another exemplary embodiment of the present invention, a program product for testing a tire of a vehicle is provided. The program product comprises a program and a computer-readable signal bearing media. The program is configured to at least facilitate creating a first condition comprising a first slip angle of the tire, obtaining a first set of data regarding performance of the tire under the first condition, creating a second condition comprising a second slip angle of the tire, obtaining a second set of data regarding performance of the tire under the second condition, and determining the relationships of the forces and moments of the tire, using the first set of data and the second set of data. The computer-readable signal bearing media bears the program.

In accordance with a further exemplary embodiment of the present invention, a system for testing a tire of a vehicle is provided. The system comprises a memory and a processor. The memory is configured to store a program that is configured to at least facilitate creating a first condition comprising a first slip angle of the tire, obtaining a first set of data regarding performance of the tire under the first condition, creating a second condition comprising a second slip angle of the tire, obtaining a second set of data regarding performance of the tire under the second condition, and determining the relationships of the forces and moments of the tire, using the first set of data and the second set of data. The processor is coupled to the memory, and is configured to at least facilitate executing the program.

BRIEF DESCRIPTION OF THE DRAWINGS

The present invention will hereinafter be described in conjunction with the following drawing figures, wherein like numerals denote like elements, and wherein:

FIG. 10 depicts lateral force and aligning moment general fit equations with non-uniformity terms for use in the process of FIG. 1, in accordance with an exemplary embodiment of the present invention.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
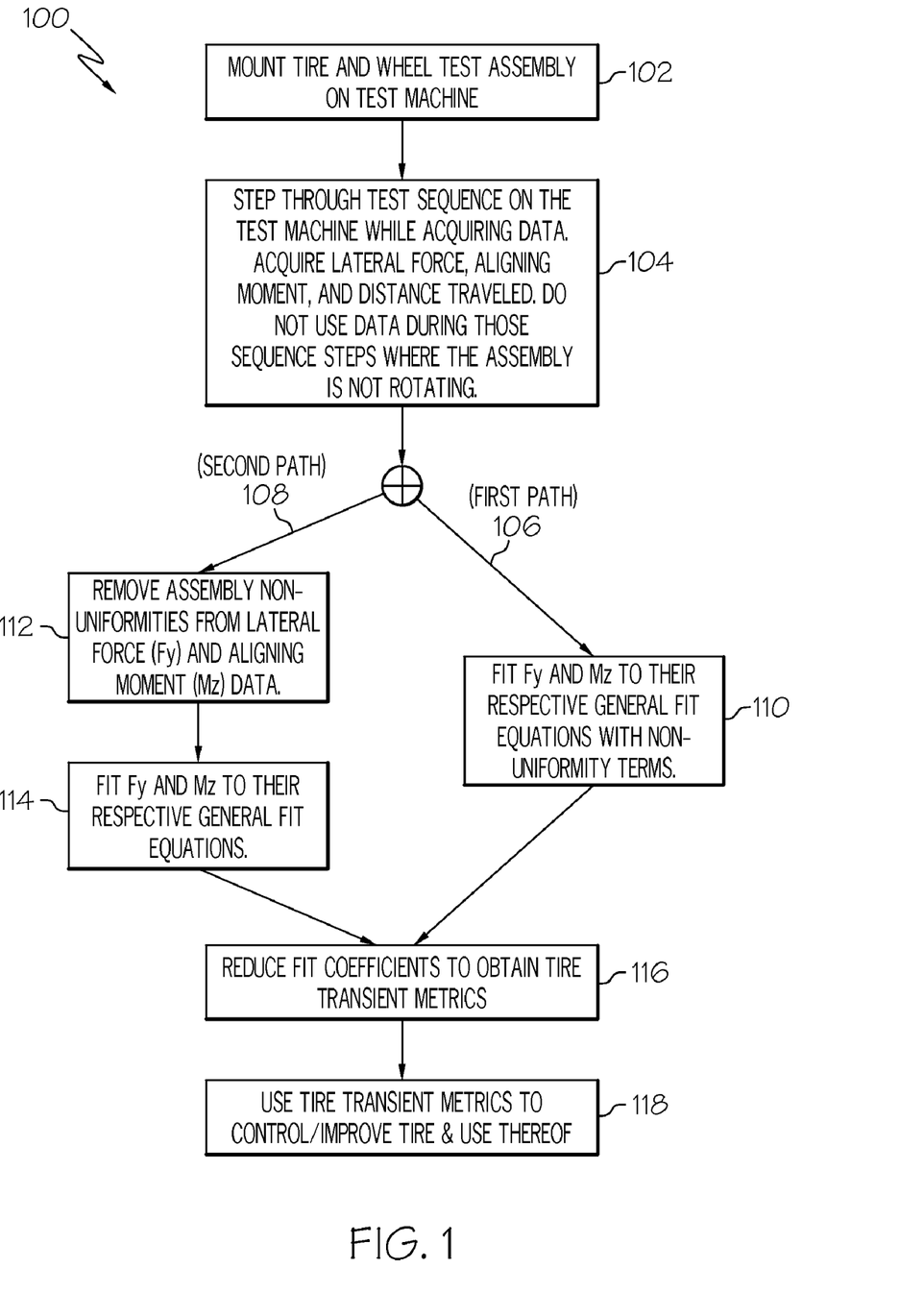
FIG. 1 is a flowchart of a method for testing a tire of a vehicle, in accordance with an exemplary embodiment of the present invention.

FIG. 1 is a flowchart of a process 100 for testing a tire of a vehicle, in accordance with an exemplary embodiment of the present invention. In the depicted embodiment, the process 100 begins with the step of mounting a tire and wheel test assembly on a test machine (step 102). A test sequence is then conducted for the tire and wheel assembly on the test machine while acquiring data (step 104). In all cases, relative movement, simulating forward travel on vehicle, between the tire and the roadbed is accomplished at low speeds, preferably in the range of 3-8 km/hr. In a preferred embodiment, the acquired data includes a lateral force, an aligning moment, and a distance travelled for the tire and wheel test assembly. Also in a preferred embodiment, data is not acquired during sequence steps in which the wheel test assembly is not rotating.

Figure 2:
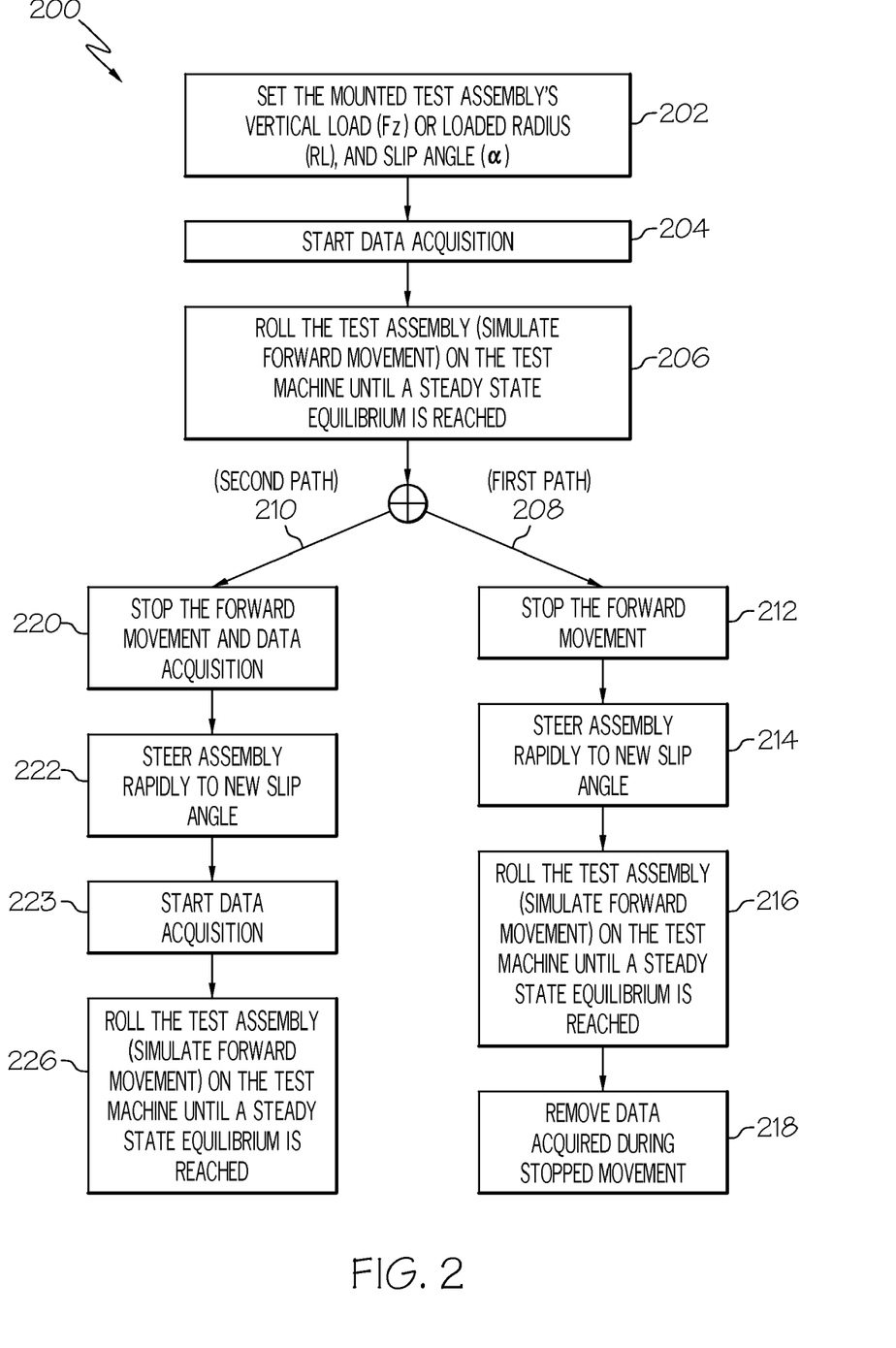
FIG. 2 is a flowchart of a first test sequence, namely a yaw imposed test sequence, that can be used in connection with the method of FIG. 1, in accordance with an exemplary embodiment of the present invention.
Figure 3:
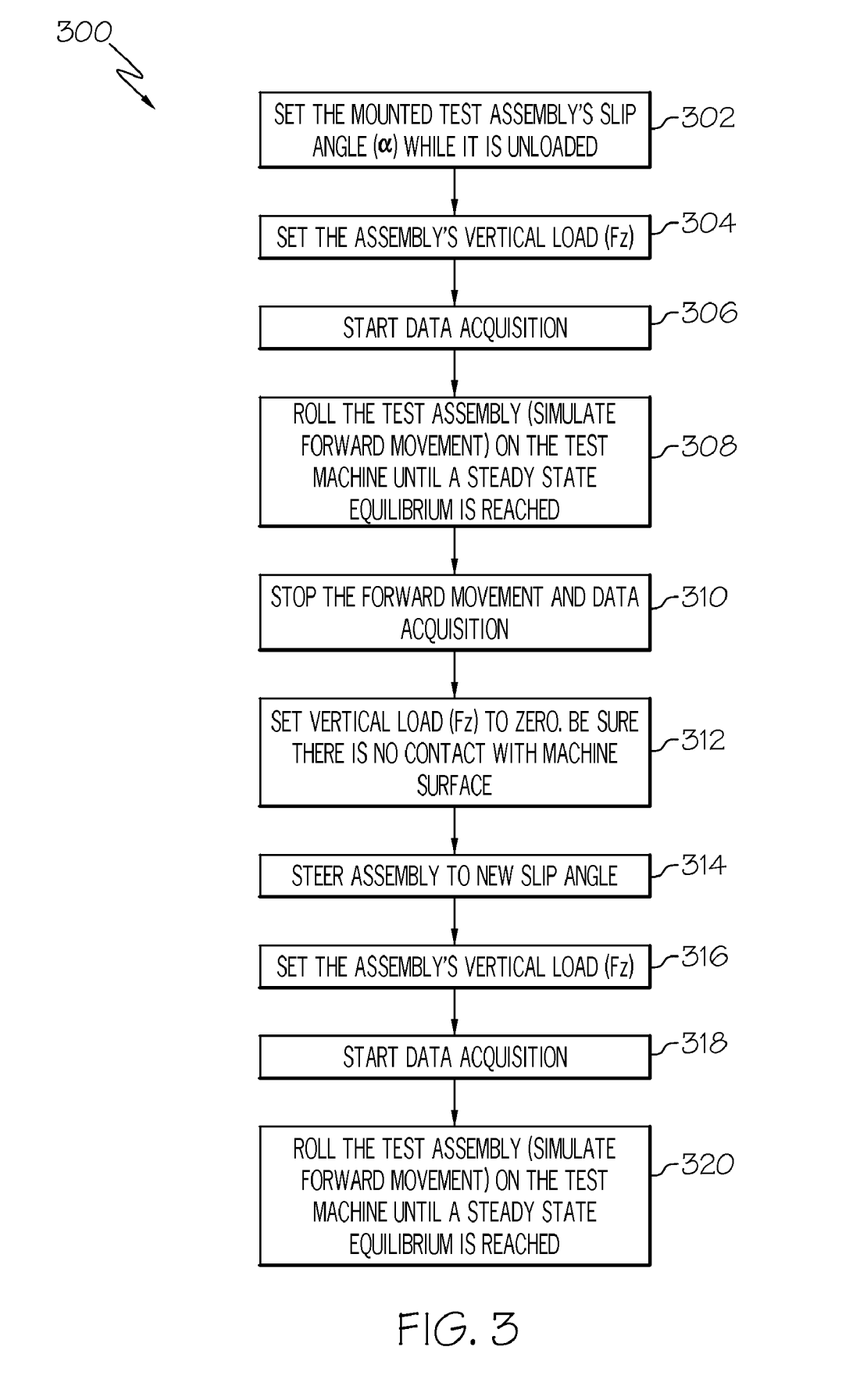
FIG. 3 is a flowchart of a second test sequence, namely a side movement imposed via side velocity test sequence, that can be used in connection with the method of FIG. 1, in accordance with an exemplary embodiment of the present invention.
Figure 4:
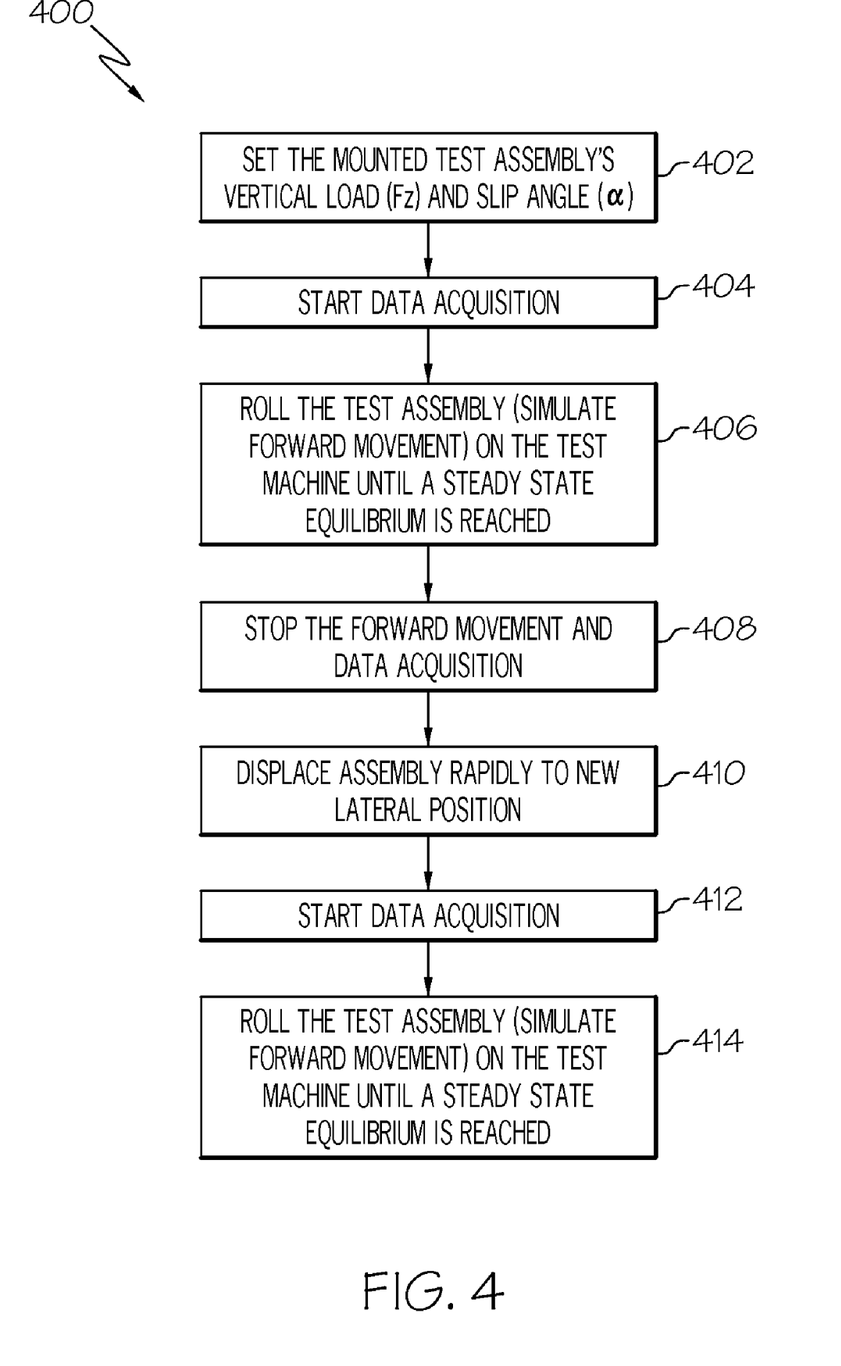
FIG. 4 is a flowchart of a third test sequence, namely a side movement imposed via lateral displacement test sequence, that can be used in connection with the method of FIG. 1, in accordance with an exemplary embodiment of the present invention.

Various test sequences may be utilized in step 104 in various embodiments of the present invention. An exemplary first test sequence 200 comprises a yaw imposed test sequence, and is depicted in FIG. 2 and described further below in connection therewith. An exemplary second test sequence 300 comprises a side movement imposed via side velocity test sequence, and is depicted in FIG. 3 and described further below in connection therewith. An exemplary third test sequence 400 comprises a side movement imposed via lateral displacement test sequence, and is depicted in FIG. 4 and described further below in connection therewith.

Figure 6:
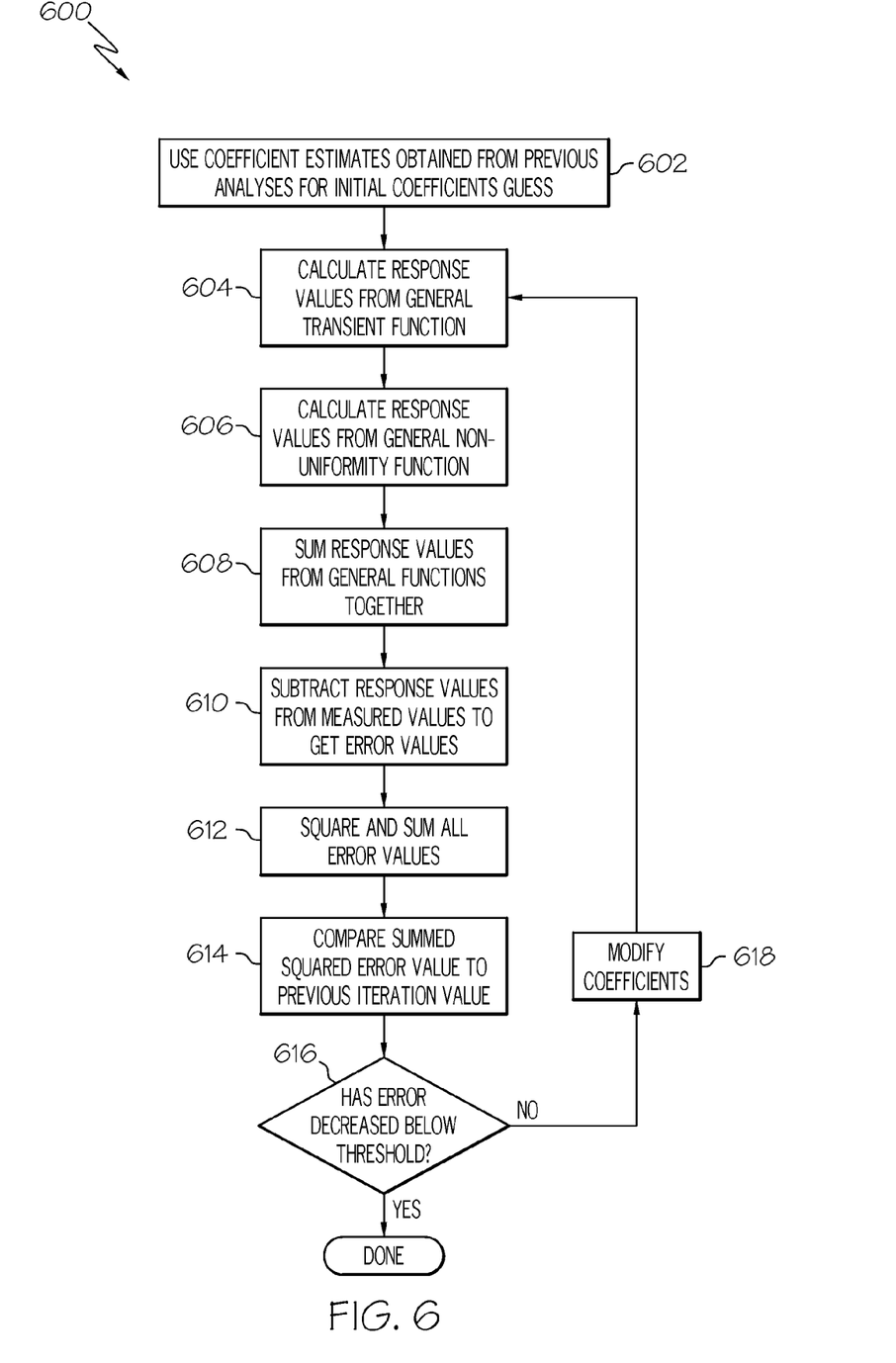
FIG. 6 is a flowchart of a data fitting method for fitting data to general functions with non-uniformity terms, and that can be used in connection with the method of FIG. 1, in accordance with an exemplary embodiment of the present invention.

Next, in one preferred embodiment, the process proceeds along a first path 106, and a lateral force ($F_y$) and an aligning moment ($M_z$) are fit to their respective general fit equations with non-uniformity terms (step 110). An exemplary embodiment of a data fitting method 600 for implementing step 110 is depicted in FIG. 6 and described further below in connection therewith in accordance with an exemplary embodiment of the present invention. In addition, FIG. 10 depicts the lateral force and aligning moment general fit equations for step 110 in accordance with a preferred embodiment. Specifically, as depicted in FIG. 10, in the distance-travelled domain, the lateral force equation for a transient function is set forth as follows:

$$a_3 \frac{d^3}{dx^3} F_y + a_2 \frac{d^2}{dx^2} F_y + a_1 \frac{d}{dx} F_y + F_y = b_0 \alpha(x) \quad \text{(Equation 1)}$$

Also as depicted in FIG. 10, in the distance-travelled domain, the lateral force equation including non-uniformities is set forth as follows:

$$F_{y,measured} = F_y + \sum_{n=1}^{N} c_n \cos(n(\theta - \theta_{cn})) \quad \text{(Equation 2)}$$

In addition, in the distance travelled domain, the aligning moment equation for a transient function is set forth as follows:

$$g_3 \frac{d^3}{dx^3} M_z + g_2 \frac{d^2}{dx^2} M_z + g_1 \frac{d}{dx} M_z + M_z = \quad \text{(Equation 3)}$$
$$h_3 \frac{d^3}{dx^3} \alpha(x) + h_2 \frac{d^2}{dx^2} \alpha(x) + h_1 \frac{d}{dx} \alpha(x) + h_0 \alpha(x)$$

Also, in the distance travelled domain, the aligning moment equation including non-uniformities is set forth as follows $$M_{z,measured} = M_z + \sum_{n=1}^{N} d_n \cos(n(\theta - \theta_{dn})) \quad \text{(Equation 4)}$$

Also as depicted in FIG. 10, in the spatial frequency domain, the lateral force equation is set forth as follows:

$$F_y(s) = \quad \text{(Equation 5)}$$
$$\frac{b_0}{a_3 s^3 + a_2 s^2 + a_1 s + 1} \alpha(s) + \sum_{n=1}^{N} c_n \cdot e^{i \cdot n \cdot \theta_{cn}} \cdot \delta(\omega - n \cdot \omega_0)$$

For practical implementation, this and subsequent equations can be used with conveniently selected tire-rotation synchronized sampling.

In addition, in the spatial frequency domain, the aligning moment equation is set forth as follows:

$$M_z(s) = \quad \text{(Equation 6)}$$
$$\frac{h_3 s^3 + h_2 s^2 + h_1 s + h_0}{g_3 s^3 + g_2 s^2 + g_1 s + 1} \alpha(s) + \sum_{n=1}^{N} d_n \cdot e^{i \cdot n \cdot \theta_{dn}} \cdot \delta(\omega - n \cdot \omega_0)$$

Care must be exercised in estimates for the coefficients of the non-uniformities in the above equations in order to assure convergence of solution. Coefficients for these terms, especially those of phase, must be sufficiently near representative values for the test tire. Use of arbitrary initial estimates can result in divergence of the fitting techniques, and is well known to those skilled in the art.

By way of reference, In Equations 1-6 above:
$F_y$=Lateral Force from Tire Transient Response (N)
$F_{y,measured}$=Measured Lateral Force with Non-Uniformity and Tire Transient Response (N)
$M_z$=Aligning Moment from Tire Transient Response (Nm)
$M_{z,measured}$=Measured Aligning Moment with Non-Uniformity and Tire Transient Response (Nm)
α=Tire Slip Angle (deg)
s=Spatial Frequency, ω (rad/m) times (−i), where i=square-root(−1)
$\omega_0$=First Harmonic Spatial Frequency of Assembly (rad/m)
n=Harmonics of Assembly (n=1, 2, ... N)
N=Highest Assembly Harmonic accounted for in non-uniformity
$a_j$, $b_0$, $g_j$, $h_j$ are all scalar coefficients in which j=0, 1, 2, 3
$c_n$, $\theta_{cn}$, $d_n$, $\theta_{dn}$ are all scalar coefficients in which n=1, ... N
δ=Delta function
x=Distance travelled (m)
θ=Angular orientation of tire (radians)

Figure 5:
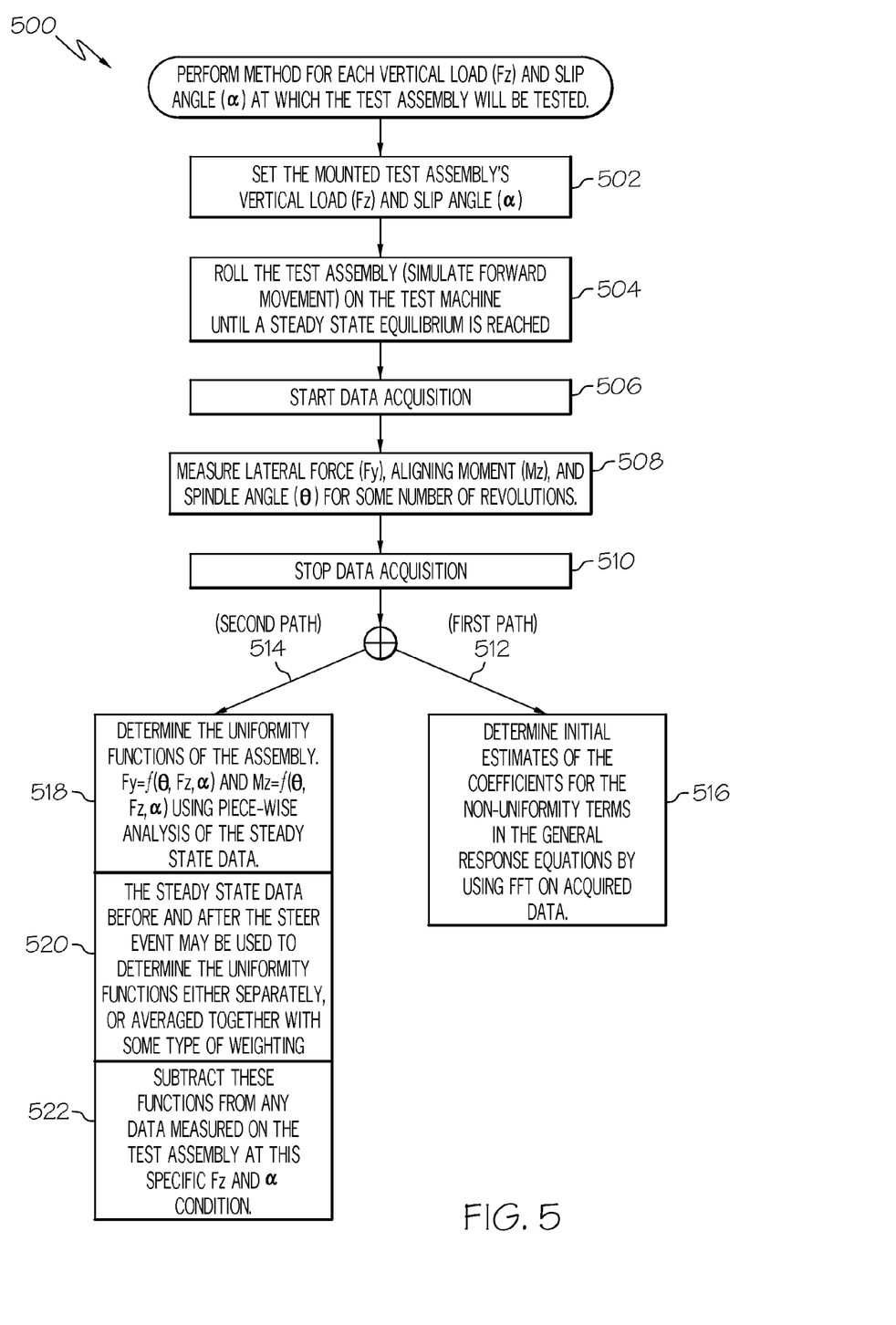
FIG. 5 is a flowchart of a method for removing tire non-uniformity related force and moment variations, and that can be used in connection with the method of FIG. 1, in accordance with an exemplary embodiment of the present invention.

Returning now to FIG. 1, in an alternate preferred embodiment, the process may proceed instead along a second path 108, in which assembly non-uniformities are removed from lateral force (Fy) and aligning moment (Mz) data (step 112). This is accomplished, for example, by referencing Equations (2) & (4), and assuming superposition of invariant non-uniformities throughout the individual test condition. An exemplary non-uniformity removal method 500 for removing these non-uniformities is depicted in FIG. 5 and described further below in connection therewith.

Figure 9:
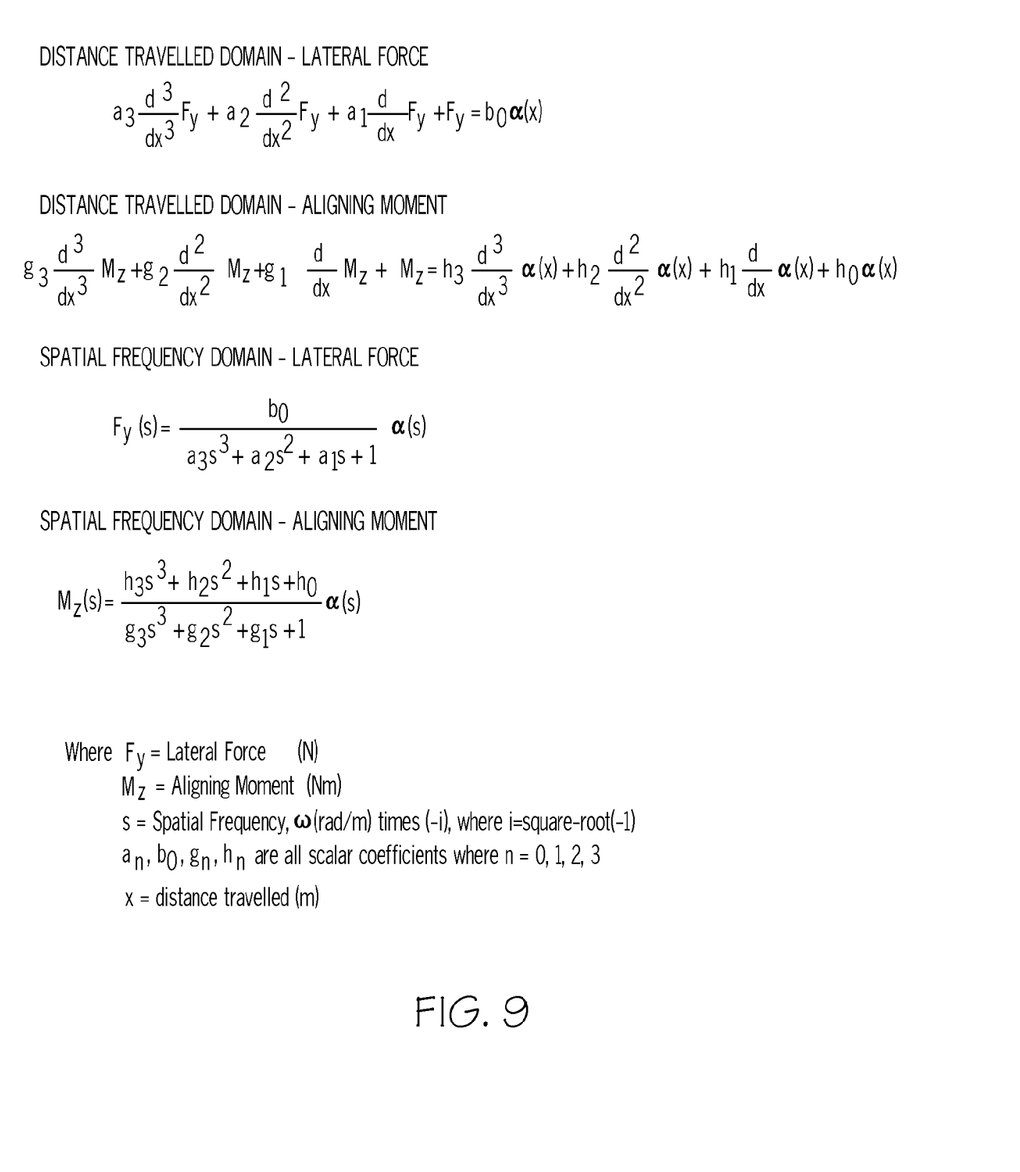
FIG. 9 depicts lateral force and aligning moment general fit equations for use in the process of FIG. 1, in accordance with an exemplary embodiment of the present invention.

The lateral force and aligning moment are then fit to their respective general fit equations (step 114). FIG. 9 depicts the lateral force and aligning moment general fit equations for step 114 in accordance with a preferred embodiment. Specifically, as depicted in FIG. 9, in the distance-travelled domain, the lateral force equation is set forth as follows:

$$a_3 \frac{d^3}{dx^3} F_y + a_2 \frac{d^2}{dx^2} F_y + a_1 \frac{d}{dx} F_y + F_y = b_0 \alpha(x) \quad \text{(Equation 7)}$$

In addition, in the distance travelled domain, the aligning moment equation is set forth as follows:

$$g_3 \frac{d^3}{dx^3} M_z + g_2 \frac{d^2}{dx^2} M_z + g_1 \frac{d}{dx} M_z + M_z = \quad \text{(Equation 8)}$$
$$h_3 \frac{d^3}{dx^3} \alpha(x) + h_2 \frac{d^2}{dx^2} \alpha(x) + h_1 \frac{d}{dx} \alpha(x) + h_0 \alpha(x)$$

Also as depicted in FIG. 9, in the spatial frequency domain, the lateral force equation is set forth as follows:

$$F_y(s) = \frac{b_0}{a_3 s^3 + a_2 s^2 + a_1 s + 1} \alpha(s) \quad \text{(Equation 9)}$$

In addition, in the spatial frequency domain, the aligning moment equation is set forth as follows:

$$M_z(s) = \frac{h_3 s^3 + h_2 s^2 + h_1 s + h_0}{g_3 s^3 + g_2 s^2 + g_1 s + 1} \alpha(s) \quad \text{(Equation 10)}$$

In Equations 7-10 above, $F_y$ denotes lateral force (N), $M_z$ represents aligning moment (Nm), s represents the product of spatial frequency (rad/m) times i, where i=square-root($-1$), and $a_n$, $b_0$, $g_n$, each represent scalar coefficients in which n=0, 1, 2, 3. In a preferred embodiment, the same general fit equations are utilized in step 114 as in step 110 discussed above.

Returning again to FIG. 1, next, regardless of whether the process is following the first path 106 or the second path 108, reduced fit coefficients are generated in order to obtain tire transient metrics (step 116). The tire transient metrics can then be used to quantify and/or improve the tire and/or the manufacture and/or use thereof (step 118). It will be appreciated that certain steps of the process 100 of FIG. 1 may vary from those depicted in FIG. 1 and/or described herein in connection therewith. It will similarly be appreciated that certain of the steps of the process 100 of FIG. 1 may occur simultaneously or in a different order than that depicted in FIG. 1 and/or described herein.

FIG. 2 is a flowchart of the above-referenced first test sequence 200 that can be used in implementing step 104 of the process 100 of FIG. 1, in accordance with an exemplary embodiment of the present invention. As noted above, the first test sequence comprises a yaw imposed test sequence.

In the depicted embodiment, the first test sequence 200 begins with the step of setting the mounted tire and wheel test assembly's vertical load ($F_z$) or Loaded Radius (RL) along with the slip angle ($\alpha$) (step 202). The above-referenced data acquisition of step 104 of FIG. 1 is begun (step 204), and the tire and wheel test assembly is rolled on the test machine until a steady state equilibrium is established (step 206).

Then, in one preferred embodiment, the process proceeds along a first path 208 following step 206. As part of the first path 208, the forward movement of the tire and wheel test assembly is stopped while data acquisition continues (step 212). The tire and wheel test assembly is then rapidly steered to a new slip angle (step 214). The tire and wheel test assembly is then rolled on the test machine until a steady state equilibrium is reached (step 216). The data acquired during stopped movement of the of the tire and wheel test assembly is then removed (step 218).

In another preferred embodiment, the process proceeds instead along a second path 210 following step 206. As part of the second path 210, forward movement of the tire and wheel test assembly is stopped, and the data acquisition is also stopped (step 220). The tire and wheel test assembly is then steered rapidly to a new slip angle (step 222). Data acquisition is then restarted (step 223). The tire and wheel test assembly is then rolled on the test machine until a steady state equilibrium is reached (step 226).

FIG. 3 is a flowchart of the above-referenced second test sequence 300 that can be used in implementing step 104 of the process 100 of FIG. 1, in accordance with an exemplary embodiment of the present invention. As noted above, the second test sequence comprises a side movement imposed via the side velocity test sequence.

In the depicted embodiment, the second test sequence 300 begins with the step of setting the mounted tire and wheel test assembly's slip angle while the tire and wheel test assembly is unloaded (step 302). The tire and wheel test assembly's vertical load ($F_z$) is then set (step 304). The above-referenced data acquisition of step 104 of FIG. 1 is begun (step 306), and the tire and wheel test assembly is rolled on the test machine until a steady state equilibrium is established (step 308).

Forward movement of the tire and wheel test assembly is stopped, and the data acquisition is also stopped (step 310). The vertical load ($F_z$) is set equal to zero (step 312), and care is taken to make sure that there is no contact with the test machine surface. The tire and wheel test assembly is then steered to a new slip angle (step 314), and the tire and wheel test assembly's vertical load (Fz) is set (step 316). The above-referenced data acquisition of step 104 of FIG. 1 then begins again (step 318). The tire and wheel test assembly is then rolled again on the test machine until a steady state equilibrium is again reached (step 320).

FIG. 4 is a flowchart of the above-referenced third test sequence 400 that can be used in implementing step 104 of the process 100 of FIG. 1, in accordance with an exemplary embodiment of the present invention. As noted above, the third test sequence comprises a side movement imposed via lateral displacement test sequence.

In the depicted embodiment, the third test sequence 400 begins with the step of setting the mounted tire and wheel test assembly's vertical load ($F_z$) and slip angle ($\alpha$) (step 402). The above-referenced data acquisition of step 104 of FIG. 1 is begun (step 404), and the tire and wheel test assembly is rolled on the test machine until a steady state equilibrium is established (step 406). Forward movement of the tire and wheel test assembly is stopped, and the data acquisition is also stopped (step 408). The tire and wheel assembly is then displaced rapidly to a new lateral position (step 410). The above-referenced data acquisition of step 104 of FIG. 1 then begins again (step 412). The tire and wheel test assembly is then rolled again to resume movement on the test machine until a steady state equilibrium is again reached (step 414).

FIG. 5 is a flowchart of a non-uniformity removal method 500 for removing tire uniformity that can be used in implementing step 112 of the process 100 of FIG. 1, in accordance with an exemplary embodiment of the present invention. In the depicted embodiment, the non-uniformity removal method 500 is performed for each nominal vertical load ($F_z$) and slip angle ($\alpha$) at which the tire and wheel test assembly is tested. For each such nominal vertical load ($F_z$) and slip angle ($\alpha$), the mounted tire and wheel test assembly's vertical load ($F_z$) and slip angle ($\alpha$) are set accordingly (step 502). The tire and wheel test assembly is then rolled on the test machine until a steady state equilibrium is reached (step 504). Data acquisition is begun (step 506). A lateral force ($F_y$), an aligning moment ($M_z$), and a spindle angle ($\theta$) are then each measured for a predetermined number of revolutions (step 508).

Then, in one preferred embodiment, the non-uniformity removal method 500 continues along a first path 512 after step 510. During the first path 512, initial estimates are determined of coefficients for non-uniformity terms in the general response equations (step 516). In a preferred embodiment, these initial estimates of the coefficients for the non-uniformity terms are determined using a fast Fourier transform (FFT) on the acquired data. Also in a preferred embodiment, the above-described lateral force (Fy) and aligning moment (Mz) general fit equations with non-uniformity terms of FIG. 10 are preferably utilized in this step.

In an alternate preferred embodiment, the non-uniformity removal method 500 continues along a second path 514 after step 510. During the second path 514, the uniformity functions of the tire and wheel assembly are determined (step 518). Preferably uniformity functions are determined using piece-wise analysis of the steady state data and the above-described equations of FIG. 9. In addition, in certain embodiments, the steady state data before, during and after the steer event may be used to determine the uniformity functions either separately or averaged together using one or more weighting techniques (step 520). The functions are then subtracted from any data measured on the tire and wheel test assembly at this specific nominal vertical load ($F_z$) and slip angle ($\alpha$) condition (step 522). In the case of non-uniformities that are substantial and significantly contaminating the transient evaluation, other methods may be likewise employed to minimize these interferences. One such method involves multiple transient test runs each starting at different angular orientations of the tire resulting in asynchronous superposition of the two sources, viz, non-uniformities and the transient responses. Decomposition of the two constituent responses from these multiple test runs is then possible by suitable synchronous averaging techniques known and practiced by those skilled in the art in other analogous applications.

Initial estimates are determined for non-uniformity terms in the general response equations (step 516). In a preferred embodiment, these initial estimates of the coefficients for the non-uniformity terms are determined using a fast Fourier transform (FFT) on the acquired data. Also in a preferred embodiment, the above-described lateral force (Fy) and aligning moment (Mz) general fit equations with non-uniformity terms of FIG. 10 are preferably utilized in this step.

FIG. 6 is a flowchart of a data fitting method 600 for fitting data to general functions with non-uniformity terms, and that can be used in implementing step 110 of the process 100 of FIG. 1, in accordance with an exemplary embodiment of the present invention. In the depicted embodiment, the data fitting method 600 begins with use of coefficient estimates obtained from previous analyses as an initial coefficients guess (step 602).

Response values are then calculated from the appropriate general transient function from FIG. 10 (step 604). Response values are then also calculated from the appropriate general non-uniformity function from FIG. 10 (step 606).

The response values from the general functions are then added together (step 608), and the response values from the measured values are then subtracted in order to obtain error values (step 610). All of the error values are then squared and added together (step 612), and the summed square error value is compared with the value of the summed square error value in a prior iteration (step 614).

A determination is then made as to whether the summed squared error value has decreased below a predetermined threshold (step 616). If it is determined that the summed squared error value has not decreased below the predetermined threshold, then the coefficients are modified accordingly (step 618), and the process returns to step 604. Steps 604-618 then repeat with iterations until a determination is made in a subsequent iteration of step 616 that the summed squared error value has decreased below the predetermined threshold. Once it is determined in any iteration of step 616 that the summed squared error value has decreased below a predetermined threshold, the data fitting method 600 is deemed to be complete. Many such iterative techniques, commonly referred to as "Minimization" or "Least-Squares" approaches are available, recognized by those skilled in the art, and can be implemented in this step.

Figure 7:
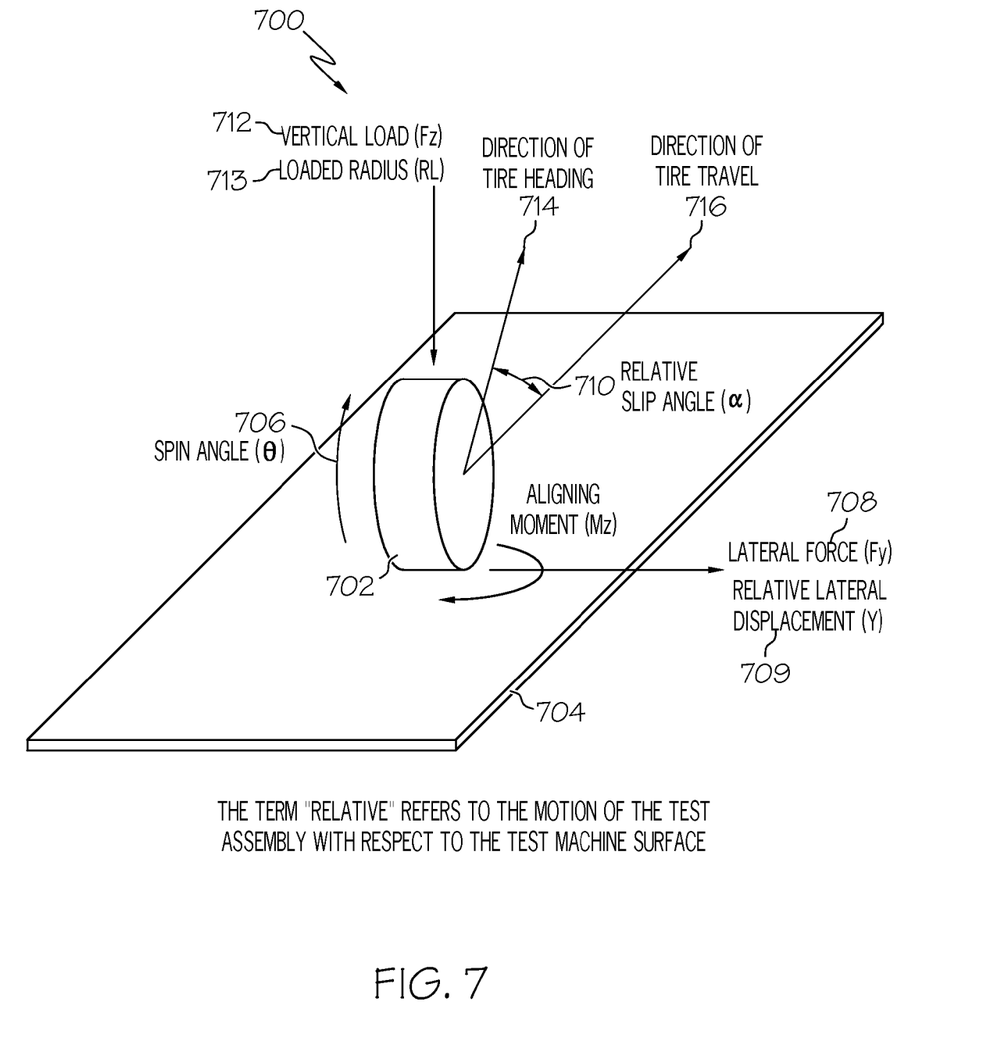
FIG. 7 is an exemplary illustration of a tire and wheel test assembly and test machine, depicted along with representations of spin angle, lateral force, relative lateral displacement, relative slip angle, vertical load, loaded radius, direction of tire heading, and direction of tire travel pertaining to the process of FIG. 1, the first test sequence of FIG. 2, the second test sequence of FIG. 3, the third test sequence of FIG. 4, the non-uniformity removal method of FIG. 5, and the data fitting method of FIG. 6, in accordance with an exemplary embodiment of the present invention.

FIG. 7 depicts, for further ease of reference, an illustration 700 of the tire and wheel test assembly 702 and the test machine 704 referenced in FIGS. 1-6 above, in accordance with an exemplary embodiment of the present invention. FIG. 7 also depicts spin angle ($\theta$) 706, lateral force ($F_y$) 708, relative lateral displacement (Y) 709, relative slip angle ($\alpha$) 710, vertical load (Fz) 712, loaded radius (RL) 713, direction of tire heading 714, and direction of tire travel 716, as also referenced in FIGS. 1-6. Further definition of these terms may be found in the Society of Automotive Engineers (SAE) standards document J670.

Figure 8:
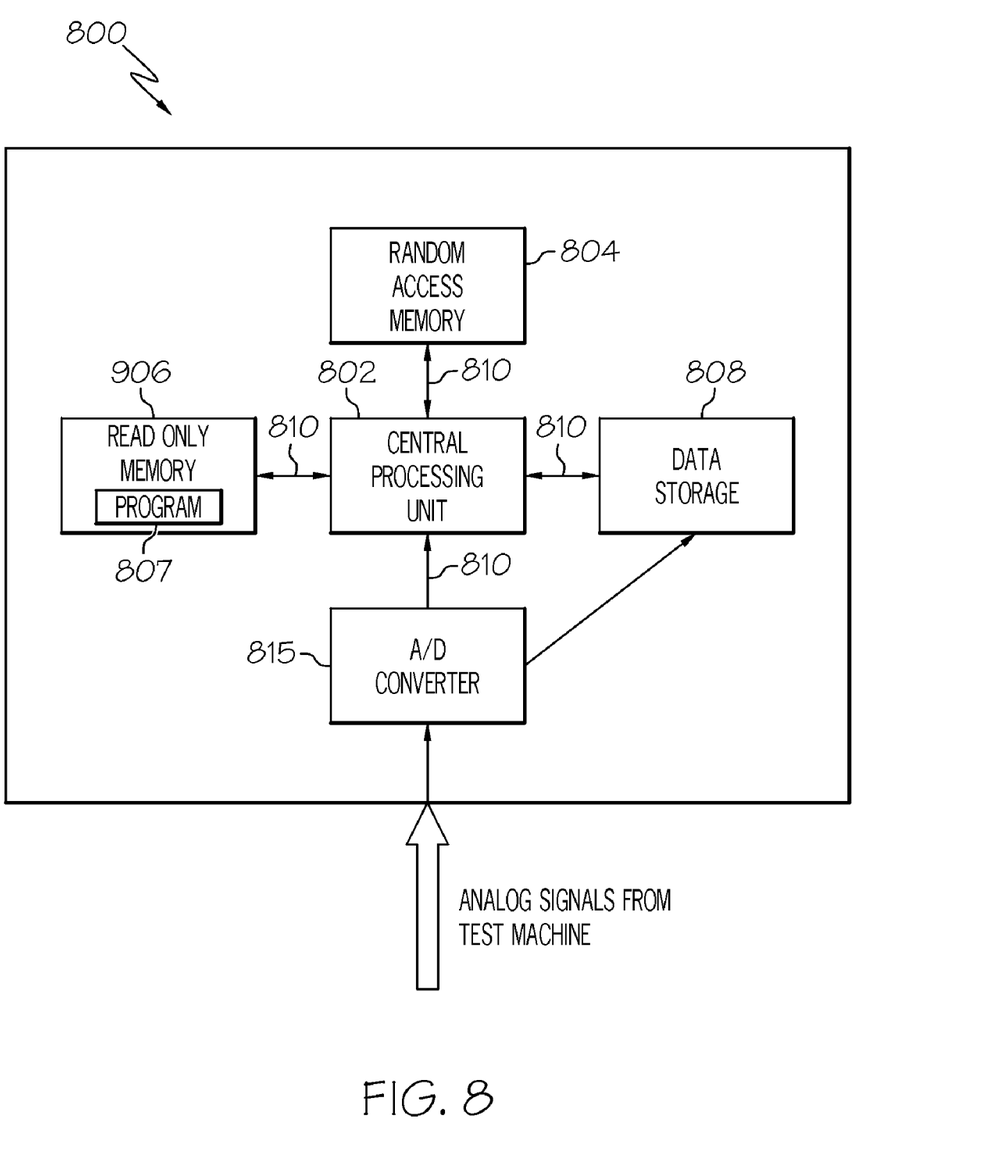
FIG. 8 is a functional block diagram of a computer and data acquisition system 800 for testing a tire of a vehicle, and that can be used in connection with the process of FIG. 1, the first test sequence of FIG. 2, the second test sequence of FIG. 3, the third test sequence of FIG. 4, the non-uniformity removal method of FIG. 5, and the data fitting method of FIG. 6, in accordance with another exemplary embodiment of the present invention.

FIG. 8 is a functional block diagram of a computer and data acquisition system 800 for testing a tire of a vehicle, that can be used in connection with the process 100 of FIG. 1, the first test sequence 200 of FIG. 2, the second test sequence 300 of FIG. 3, the third test sequence 400 of FIG. 4, the non-uniformity removal method 500 of FIG. 5, and the data fitting method 600 of FIG. 6, in accordance with another exemplary embodiment of the present invention.

In the embodiment depicted in FIG. 8, the computer and data acquisition system 800 includes a central processing unit or processor 802, a random access memory 804, a read only memory 806, a computer bus 810, and a storage device 808. The central processing unit or processor 802 performs the computation and control functions of the computer and data acquisition system 800 or portions thereof, preferably in executing a program 807 that performs the steps of the process 100 of FIG. 1, the first test sequence 200 of FIG. 2, the second test sequence 300 of FIG. 3, the third test sequence 400 of FIG. 4, the non-uniformity removal method 500 of FIG. 5, and the data fitting method 600 of FIG. 6 and described above in connection therewith.

The central processing unit or processor 802 may comprise any type of processor or multiple processors, single integrated circuits such as a microprocessor, or any suitable number of integrated circuit devices and/or circuit boards working in cooperation to accomplish the functions of a processing unit. During operation, the central processing unit or processor 802 executes one or more programs 807 preferably stored within the random access memory 804 and, as such, controls the general operation of the computer and data acquisition system 800.

The read only memory 806 stores a program or programs 807 that execute one or more embodiments of processes such as the steps of the process 100 of FIG. 1, the first test sequence 200 of FIG. 2, the second test sequence 300 of FIG. 3, the third test sequence 400 of FIG. 4, the non-uniformity removal method 500 of FIG. 5, and the data fitting method 600 of FIG. 6 and described above in connection therewith.

The random access memory 804 can be any type of suitable memory. This would include various types of dynamic random access memory (DRAM) such as SDRAM (synchronous DRAM), various types of static RAM (SRAM-static random access memory), and various types of non-volatile memory (PROM-programmable read only memory, EPROM-erasable programmable read only memory, and flash).

The computer bus 810 serves to transmit programs, data, status, and other information or signals between the various components of the computer and data acquisition system 800. The computer bus 810 can be any suitable physical or logical means of connecting computer systems and components. This includes, but is not limited to, direct hard-wired connections, fiber optics, and infrared and wireless bus technologies.

The storage device 808 can be any suitable type of storage apparatus, including direct access storage devices such as hard disk drives, flash systems, floppy disk drives and optical disk drives. In one exemplary embodiment, the storage device 808 is a program product from which read only memory 806 can receive a program 807 that executes (and/or that the central processing unit or processor 802 executes and/or causes to execute) one or more embodiments of the process 100 of FIG. 1, the first test sequence 200 of FIG. 2, the second test sequence 300 of FIG. 3, the third test sequence 400 of FIG. 4, the non-uniformity removal method 500 of FIG. 5, and the data fitting method 600 of FIG. 6 and described above in connection therewith. As one exemplary implementation, the computer and data acquisition system 800 may also utilize an Internet website, for example for providing, storing, or maintaining data or performing operations thereon.

In addition, as shown in FIG. 8, in certain embodiments the computer and data acquisition system 800 also includes a converter 815. In certain embodiments, the converter 815 receives analog signals from the test machine and converts the analog signals to digital signals for use by the computer and data acquisition system 800. Those skilled in the art also recognize the need for protecting the acquired data from such effects commonly referred to as "Aliasing". Protection analog circuits, over-sampling, or other methods can be used to avoid Aliasing. Aliasing is the contamination of data that occurs when signal content exists at frequencies in excess of a threshold frequency. The establishment of threshold frequencies includes setting an upper limit for acceptable signal content by frequency, said frequency being related to the sampling frequency. These techniques are known to those skilled in the art and need to be considered for successful implementation.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer and data acquisition system 800 may also otherwise differ from the embodiment depicted in FIG. 8, for example in that the computer and data acquisition system 800 may be coupled to or may otherwise utilize one or more remote computer systems and/or other control systems.

It will likewise be appreciated that the process 100 of FIG. 1, the first test sequence 200 of FIG. 2, the second test sequence 300 of FIG. 3, the third test sequence 400 of FIG. 4, the non-uniformity removal method 500 of FIG. 5, and the data fitting method 600 of FIG. 6, the computer and data acquisition system 800 and associated program products and programs of FIG. 8, and/or the parts and/or components thereof, may vary in various embodiments of the present invention.

Accordingly, improved methods, program products, and systems are provided for testing tires of vehicles. The improved methods, program products, and systems allow for improved testing of tires under dynamic conditions. Specifically, the improved methods, program, products, and systems provide for determination of relationships between tire forces and moments under different slip angles for the tire. This allows for improved testing of tires as well as improved fine-tuning of how the particular types of tires are manufactured, how the tires are aligned, managed, controlled, and/or utilized in the vehicle, how and when the tires are maintained, and/or how and when the tires are replaced, among other possible applications of the methods, program products, and systems provided herein.

It will be appreciated that, in various embodiments, the disclosed methods, program products, and systems may vary from those depicted in the figures and described herein. For example, the imposition of slip angles and lateral displacements are described in the preceding as movements of the tire; the relevant conditions, however, are only relative movements between the tire and the roadbed. Such relative motions can also be achieved with stationary wheel spindles and articulated roadbeds, thereby achieving equivalent imposed conditions between the tire and the roadbed by movements of the roadbed and not the tire. Any combination of tire and roadbed movements, furthermore, can also be implemented in order to achieve the equivalent conditions of relative movements. It will similarly be appreciated that, while the disclosed methods, program products, and systems are described above as being used in connection with automobiles such as sedans, trucks, vans, sports utility vehicles, and cross-over vehicles, the disclosed methods, program products, and systems may also used in connection with any number of different types of vehicles, and in connection with any number of different systems thereof and environments pertaining thereto.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for testing a tire of a vehicle, the method comprising the steps of:
   creating a first test condition comprising a first slip angle of the tire;
   obtaining a first set of data regarding performance of the tire under the first condition;
   creating a second condition comprising at least one of: a second slip angle of the tire and a lateral displacement;
   obtaining a second set of data regarding performance of the tire under the second condition; and
   determining a relationship between a force of the tire and a moment of the tire, using the first set of data and the second set of data.

2. The method of claim 1, wherein:
   the step of creating the second condition comprises the step of generating a step input for the tire; and
   the step of determining the relationship further comprises the step of characterizing a response of the tire to the step input.

3. The method of claim 1, wherein:
   the step of creating the first condition comprises the step of allowing forward movement of the tire; and
   the step of creating the second condition comprises the steps of:
      stopping forward movement of the tire;
      at least one of: steering the tire and moving the tire laterally; and
      resuming forward movement of the tire.

4. The method of claim 1, wherein the step of creating the first condition comprises the steps of:
   orienting the tire at a first slip angle;
   loading the tire with a first tire load; and
   beginning forward travel of the tire.

5. The method of claim 4, wherein the step of creating the second condition comprises the steps of:
   reducing the tire load; and
   steering the tire to a second slip angle.

6. The method of claim 1, wherein the first set of data and the second set of data each comprise lateral force data and aligning moment data, and the method further comprising the steps of:
   fitting the force data and the moment data to respective general fit equations; and
   reducing fit coefficients for the respective general fit equations.

7. The method of claim 1, further comprising the step of:
   controlling use of the tire using the relationship between the force of the tire and the moment of the tire.

8. A program product for testing a tire of a vehicle, the program product comprising:
   (a) a program configured to at least facilitate:
      creating a first condition comprising a first slip angle of the tire;
      obtaining a first set of data regarding performance of the tire under the first condition;
      creating a second condition comprising at least one of: a second slip angle and a lateral displacement of the tire;
      obtaining a second set of data regarding performance of the tire under the second condition; and
      determining a relationship between a force of the tire and a moment of the tire, using the first set of data and the second set of data; and
   (b) a computer-readable signal bearing media bearing the program.

9. The program product of claim 8, wherein the program is further configured to at least facilitate:
   generating a step input for the tire; and
   characterizing a response of the tire to the step input.

10. The program product of claim 8, wherein the program is further configured to at least facilitate:
    creating the first condition by at least facilitating:
       allowing forward movement of the tire; and
    creating the second condition by at least facilitating:
       stopping forward movement of the tire;
       at least one of steering the tire and moving the tire laterally; and
       resuming forward movement of the tire.

11. The program product of claim 8, wherein the program is further configured to at least facilitate:
    creating the first condition by at least facilitating:
       orienting the tire at a first slip angle;
       loading the tire with a first tire load; and
       beginning forward travel of the tire.

12. The program product of claim 11, wherein the program is further configured to at least facilitate:
    creating the second condition by at least facilitating:
       reducing the tire load; and
       steer the tire to a second slip angle.

13. The program product of claim 8, wherein the first set of data and the second set of data each comprise lateral force data and aligning moment data, and the program is further configured to at least facilitate:
    fitting the force data and the moment data to respective general fit equations; and
    reducing fit coefficients for the respective general fit equations.

14. The program product of claim 8, wherein the program is further configured to at least facilitate controlling use of the tire using the relationship between the force of the tire and the moment of the tire.

15. A system for testing a tire of a vehicle, the system comprising:
    (a) a memory storing a program, the program configured to at least facilitate:
       creating a first condition comprising a first slip angle of the tire;
       obtaining a first set of data regarding performance of the tire under the first condition;
       creating a second condition comprising at least one of a second slip angle of the tire and a lateral displacement;
       obtaining a second set of data regarding performance of the tire under the second condition; and
       determining a relationship between a force of the tire and a moment of the tire, using the first set of data and the second set of data; and
    (b) a processor coupled to the memory, the processor configured to at least facilitate executing the program.

16. The system of claim 15, wherein the program is further configured to at least facilitate:
    generating a step input for the tire; and
    characterizing a response of the tire to the step input.

17. The system of claim 15, wherein the program is further configured to at least facilitate:
    creating the first condition by at least facilitating allowing forward movement of the tire; and creating the second condition by at least facilitating:
  stopping forward movement of the tire;
  at least one of steering the tire and moving the tire laterally; and
  resuming forward movement of the tire.

18. The system of claim 15, wherein the program is further configured to at least facilitate:
  creating the first condition by at least facilitating:
    orienting the tire at a first slip angle;
    loading the tire with a first tire load; and
    beginning forward travel of the tire; and
  creating the second condition by at least facilitating:
    reducing the tire load; and
    steering the tire to a second slip angle.

19. The system of claim 15, wherein the first set of data and the second set of data each comprise lateral force data and aligning moment data, and the program is further configured to at least facilitate:
  fitting the force data and the moment data to respective general fit equations; and
  reducing fit coefficients for the respective general fit equations.

20. The system of claim 15, wherein the program is further configured to at least facilitate controlling use of the tire using the relationship between the force of the tire and the moment of the tire.

* * * * *